(12) United States Patent
Lord

(10) Patent No.: US 6,554,564 B1
(45) Date of Patent: Apr. 29, 2003

(54) REDUCED NOISE FAN EXIT GUIDE VANE CONFIGURATION FOR TURBOFAN ENGINES

(75) Inventor: Wesley K. Lord, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/991,502

(22) Filed: Nov. 14, 2001

(51) Int. Cl.$^7$ ................................................ F01D 9/04
(52) U.S. Cl. ..................................... 415/119; 415/211.2
(58) Field of Search .................................. 415/119, 159, 415/208.1, 208.2, 208.3, 208.5, 211.2

(56) References Cited

U.S. PATENT DOCUMENTS

| | | | |
|---|---|---|---|
| 1,261,807 A | 4/1918 | Greenawalt | 415/204 |
| 2,918,254 A | 12/1959 | Hausammann | 415/116 |
| 2,938,662 A | 5/1960 | Eckert et al. | 416/200 R |
| 2,962,260 A | 11/1960 | Foley | 416/189 |
| 3,010,642 A | 11/1961 | Dickmann et al. | 415/191 |
| 3,477,381 A | 11/1969 | Becker | 415/220 |
| 3,536,414 A | 10/1970 | Smith, Jr. | 415/208.5 |
| 3,572,034 A | 3/1971 | Fisher et al. | 60/341 |
| 4,470,755 A * | 9/1984 | Bessay | 415/119 X |
| 4,712,980 A | 12/1987 | Gely et al. | 416/224 |
| 4,860,537 A * | 8/1989 | Taylor | 60/226.1 |
| 4,893,990 A | 1/1990 | Tomohiro et al. | 416/228 |
| 5,088,892 A | 2/1992 | Weingold et al. | 415/193 |
| 5,167,489 A | 12/1992 | Wadia et al. | 415/182.1 |
| 5,246,339 A | 9/1993 | Bengtsson et al. | 415/208.1 |
| 5,616,004 A | 4/1997 | Alizadeh | 416/238 |
| 6,036,438 A * | 3/2000 | Imai | 415/208.1 X |
| 6,045,327 A | 4/2000 | Amr | 415/211.2 |
| 6,079,948 A * | 6/2000 | Sasaki et al. | 415/208.1 X |
| 6,195,983 B1 * | 3/2001 | Wadia et al. | 415/208.1 X |

FOREIGN PATENT DOCUMENTS

| JP | 59-115500 | 7/1984 | 415/914 |
|---|---|---|---|

OTHER PUBLICATIONS

"Design Selection and Analysis of a Swept and Leaned Stator Concept", E. Envia and M. Nallasamy, Journal of Sound and Vibration, vol. 228, 1999, pp 793–836.

"Influence of Lean and Swep on Noise of Cascades with Turbulent Inflow", Donald B. Hanson, AIAA99–1863, AIAA/CEAS 5th Aeroacoustics Conference, Seattle Washington, May 10–12, 1999.

"Theory for Broadband Noise of Rotor and Stator Cascades with Inhomogeneous Inflow Turbulence Including Effects of Lean and Sweep", Donald B. Hanson, NASA/CR–2001–210762, May 2001.

"Fan Noise Reduction: An Overview", E. Envia, AIAA–2001–0661, 39th Aerospace Sciences Meeting & Exhibit, Reno, NV, Jan. 8–11, 2001.

"Benefits of Swept and Leaned Stators for Fan Noise Reduction", Woodward, R.P., Elliott, D.M., Hughes, C.E., Berton, J J., AIAA–99–0497, AIAA Aerospace Sciences Meeting in Reno, Nevada, Jan. 1999.

* cited by examiner

Primary Examiner—Edward K. Look
Assistant Examiner—Richard A. Edgar

(57) ABSTRACT

In a turbofan engine, the fan exit guide vanes in the bypass duct have the radially outermost 5% to 50% of their leading edge swept either forward or rearward at an angle of between 10° and 60° to reduce broadband noise. No more than 50%, but at least 5% of the full vane span is swept in that manner. Because most of the broadband noise is generated at the radially outermost portion of the vane, sweeping of the full length of the vane is not necessary. This allows use of a vane that takes up less axial length within the bypass duct and may weigh less than prior art swept vanes.

6 Claims, 6 Drawing Sheets

REDUCED NOISE FAN EXIT GUIDE VANE CONFIGURATION FOR TURBOFAN ENGINES

BACKGROUND OF THE INVENTION

1. Technical Field

This invention relates to gas turbine engines, and in particular to turbofan engines.

2. Background Information

Minimizing the noise generated by gas turbine engines, such as are used in aircraft, without significantly increasing the cost, complexity, structural integrity and performance of the engine is an important consideration in engine design. Some turbofan engines, especially high bypass ratio turbofans, are known to generate significant noise as a result of unsteady flow within the fan stage between the fan rotor and the immediately following row of fan exit guide vanes (FEGV's) in the bypass duct.

One technique that has been demonstrated to successfully reduce that noise is to sweep (i.e. tilt) the FEGV's rearwardly across the duct from their radially inner to their radially outer ends. This has the effect of increasing the spanwise phase variation of the rotor wake interaction with the stator vane, causing more noise cancellation. Significant reductions in rotor-stator interaction tone noise have been demonstrated experimentally with this swept stator vane design concept, as discussed in "Design Selection and Analysis of a Swept and Leaned Stator Concept", by E. Envia and M. Nallasamy, Journal of Sound and Vibration, Vol. 228, 1999, pp 793–836. Additional benefit has been realized in terms of fan broadband noise reduction with swept stator vanes. The mechanism of broadband noise reduction associated with swept stator vanes is not due to spanwise phase cancellation. Rather, it is thought to derive from a reduction in the normal component of velocity incident upon the stator vanes. The idea is to reduce the normal component of the fan flow against the leading edge of the vane. It is that normal component which is believed to create a major portion of the noise. This is discussed in a paper by Donald B. Hanson, "Influence of Lean and Sweep on Noise of Cascades with Turbulent Inflow", AIAA 99-1863, AIAA/CEAS $5^{th}$ Aeroacoustics Conference, Seattle Wash., May 10–12, 1999.

FIG. 1 is representative of the prior art. In FIG. 1, which is a simplified cross section of the forward portion of a gas turbine engine 10, a plurality of circumferentially spaced apart fan blades 100 rotate around the engine centerline 102. Airflow entering the engine inlet 103 passes through the row of fan rotor blades and is split between the core engine flow path 104 and the fan bypass flow path 106. The core flow passes through multiple stages of the compressor 108. The bypass flow passes through a row of circumferentially spaced apart FEGV's 110 in the bypass flow path. The FEGV's remove the swirl imparted to the bypass flow by the fan blades 100 and redirect the flow substantially axially. In accordance with the prior art, to reduce noise, the leading edges 112 of the vanes 110 are swept rearwardly, across the full radial extent of the bypass duct, from their radially innermost ends 114 to their radially outermost ends 116.

One drawback of using swept FEGV's of the type described in the prior art is the additional axial length required within the bypass duct to accommodate the sweep, as compared to vanes with substantially radially extending leading and trailing edges. Furthermore, swept vanes of the prior art are longer, and thus heavier and costlier, than unswept vanes. For these reasons it is desirable to find alternative means to reduce the noise hereinabove described.

BRIEF SUMMARY OF THE INVENTION

According to the present invention, the fan exit guide vanes within the bypass duct of a turbofan engine each have their leading edges extending across the fan bypass duct from duct inner wall to the duct outer wall, each leading edge including (a) a radially inner portion extending outwardly from the inner wall and having a sweep angle A, and (b) a radially outermost portion extending inwardly from the outer wall for 5% to 50% of the span of said airfoil and having either a rearward or forward sweep angle B of between 10° and 60°, wherein if sweep angle B is forward, then sweep angle A is a rearward sweep angle or 0°, and if sweep angle B is rearward, then sweep angle A is forward or 0°.

As used in this application and the appended claims, a vane sweep angle B is the acute angle formed between the portion of the vane leading edge where sweep is to be determined and a radial line passing through that leading edge portion. (Note: The Hanson reference mentioned above defines two conventions, a "cascade system" convention and a "duct system" convention to describe lean and sweep geometry. The sweep angles A and B defined in this application are based upon the cascade system convention.) In cases where the leading edge portion is not simply a straight line, for purposes of determining the sweep angle, replace the leading edge line of that portion with a closest fit straight line. If the leading edge portion is parallel to the radial line, the sweep angle is 0°. A leading edge with a "forward" sweep angle extends radially outwardly from a downstream point to an upstream point. A leading edge with a "rearward" sweep angle extends radially outwardly from an upstream point to a downstream point. Throughout this application and appended claims, the sweep angle "A" represents the sweep angle of the leading edge of a radially inner portion of the vane span adjacent the inner flow path wall, and a sweep angle "B" represents the sweep angle of the leading edge of the radially outer portion of the vane span adjacent the outer flow path wall.

As mentioned above, some of the noise created by the interaction of the fan flow and the FEGV's may be reduced by reducing the component of the fan flow normal to the FEGV leading edge. It is for this reason that swept vanes have been used successfully in the prior art. The present invention is based upon experimental rig data and mathematical modeling that indicates a very significant portion of the noise is broadband noise created by high levels of inflow turbulence at the radially outermost portion of the span of the FEGV's, especially the outermost 10% to 30% of the span. While it may be beneficial to sweep only the outermost 5% of the span, sweeping more than 50% of the radially outermost portion of the span adds axial length and weight to the vane row without necessarily providing worthwhile additional broadband noise reduction.

The sweep may be either forward or rearward, as further explained in the Detailed Description of the Present Invention, below. Because the sweep is preferably applied only to the radially outermost portion of the vanes, the overall axial length of each vane is considerably less than the length of prior art swept vanes, which are swept in one direction over the entire vane span. Because the swept vanes of the present invention do not require as much flow path axial length as swept vanes of the prior art having the same sweep angle, they may use a greater sweep angle than used in prior art and still provide a benefit of less flow path axial length and less weight.

It is also contemplated that, in addition to sweeping the radially outer portion of the FEGV's, the radially inner portion of the FEGV's may also be swept, but in the opposite direction. This could be done if it were determined that sweeping the radially inner portion of the vanes added additional noise benefits that outweighed other considerations, such as performance and cost penalties. Sweeping the radially inner portion of the FEGV's, or some part of the inner portion, such as that portion adjacent the inner bypass duct wall, in conjunction with but opposite to the sweep direction of the outer portion, could be done without any increase in the axial length of the vane row.

The foregoing features and advantages of the present invention will become more apparent in light of the following detailed description of exemplary embodiments thereof as illustrated in the accompanying drawings.

DETAILED DESCRIPTION OF THE INVENTION

Figure 1:
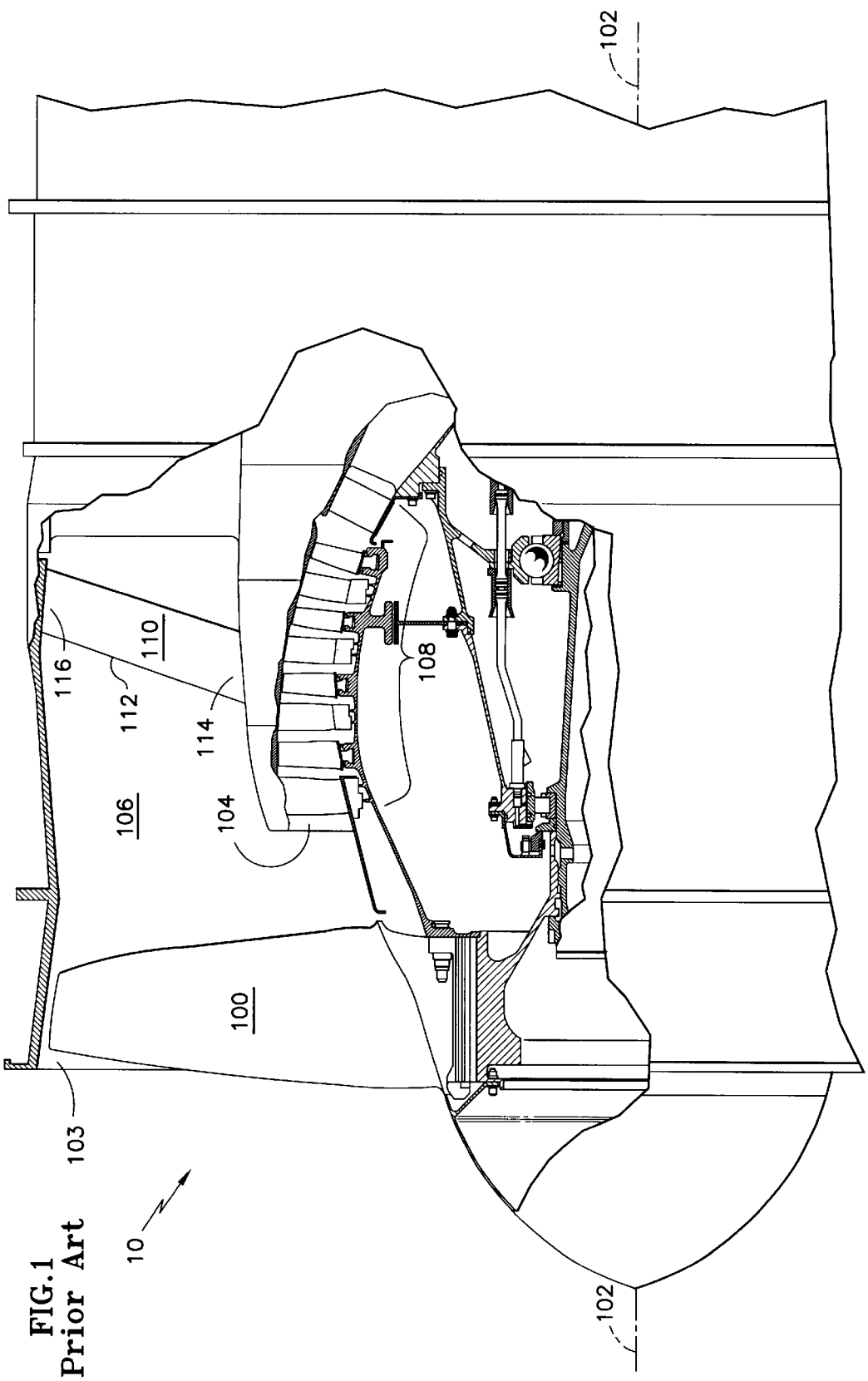
FIG. 1 (prior art) is a simplified cross-sectional view of the forward portion of an aircraft turbofan engine having a row of swept fan exit vanes within the fan bypass duct.
Figure 2:
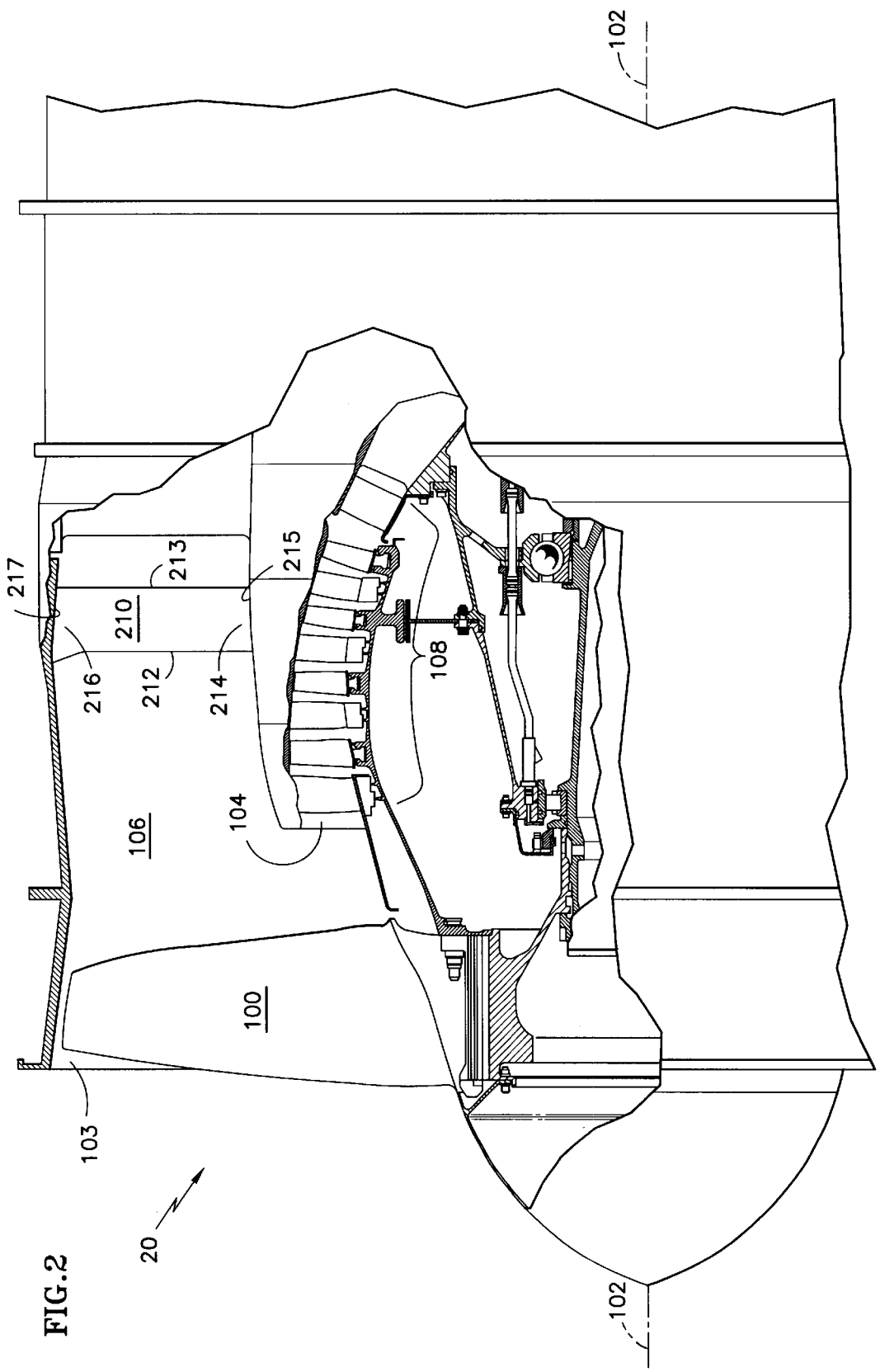
FIG. 2 is a simplified cross-sectional view of the forward portion of an aircraft turbofan engine having a row of fan exit guide vanes according to the present invention.

An exemplary embodiment of a gas turban engine 20 according to the present invention is shown in FIG. 2. In that figure, components that are essentially the same as those shown in FIG. 1 have been given the same respective reference numerals.

Figure 3:
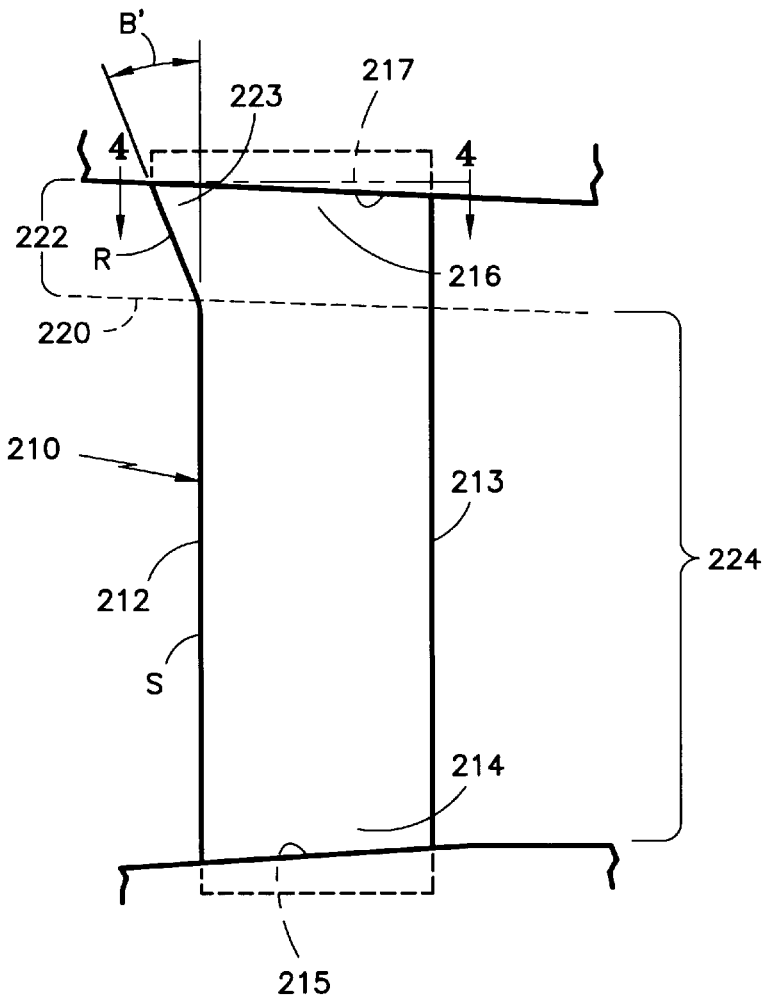
FIG. 3 is an enlarged view of the fan exit guide vane depicted in FIG. 2.
Figure 4:
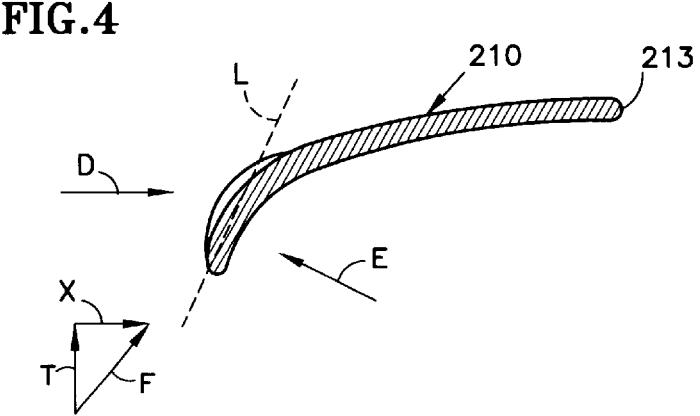
FIG. 4 is a sectional view of the fan exit guide vane of FIG. 3, taken along the line 4—4 of FIG. 3.
Figure 5:
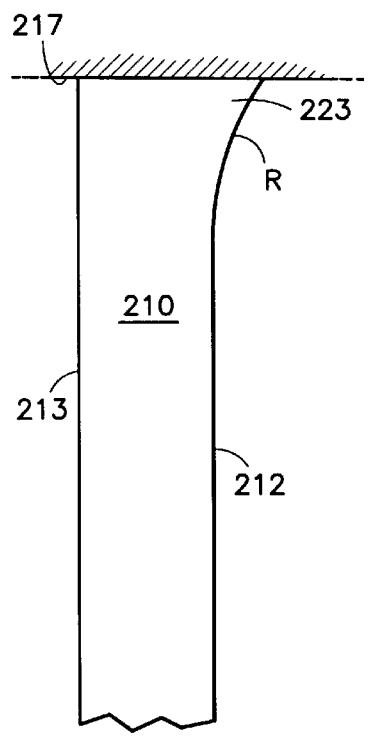
FIG. 5 is a front view of the fan exit guide vane of FIG. 3, looking toward the rear of the engine in the direction D parallel to the engine axis.

In FIG. 2, FEGV's of the present invention have been designated by the reference numeral 210. Referring to FIGS. 3–5, each vane 210 has a leading edge 212, a trailing edge 213, a radially innermost end 214 adjacent the bypass duct inner flow path wall 215, and a radially outermost end 216 adjacent the bypass duct outer flow path wall 217. The trailing edge 213 lies substantially along a radial line, and, therefore, has substantially no sweep.

For purposes of explanation, a dotted line 220 (FIG. 3) divides the full span of the vane 210 (and thus the full length of the leading edge) into a radially outer span portion 222 and a radially inner span portion 224. The portion of the leading edge 212 over the entire inner span portion 224 is designated by the letter S and lies along a substantially radial line. Therefore, the leading edge portion S has substantially no sweep, or a 0° sweep angle. The portion of the leading edge 212 along the outer span portion 222 is designated by the letter S.

Figure 6:
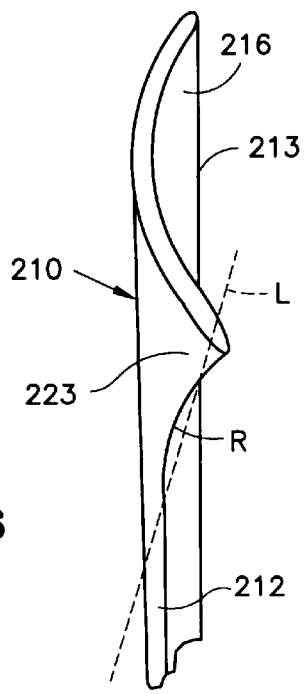
FIG. 6 is a three dimensional view of the radially outer portion of the fan exit guide vane of FIGS. 2–5.

Although the leading edge portion R seems to be a straight line in the view of FIG. 3, it is actually curved. This is best seen in the views of FIGS. 4–6. In FIG. 6 it can be seen that the leading edge portion R forms a curved, but generally triangular extension 223 of the vane 210. In FIG. 4 the magnitude and direction of the fan flow in the bypass duct is represented by the vector F. The vector X is the component of the fan flow F in the axial direction. The vector T is the tangential component of the fan flow F perpendicular to the axial direction X. As mentioned in the Background Information of this specification, to reduce broadband noise the leading edge of the vanes are swept to reduce the magnitude of the component of the fan flow F that is normal to the vane leading edge. As best shown in FIGS. 5 and 6, in this embodiment, the extension 223 (and its leading edge R) leans circumferentially in a direction opposite to the general direction of the tangential flow component T. The lean further reduces the component of the fan flow F normal to the vane leading edge.

Figure 7:
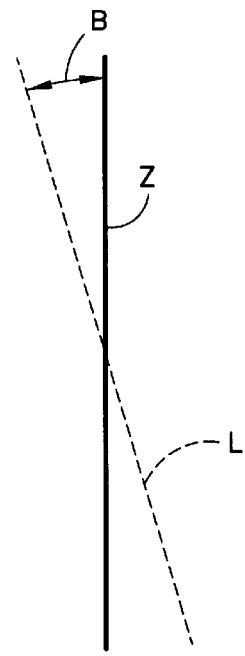
FIG. 7 is a view in the direction E of FIG. 4 showing a true view of the sweep angle B of the vane.

The fact that the outermost portion of the vane leading edge is swept can be seen in FIG. 3 from the angle B' formed in the plane of the paper between the leading edge portion R and a radial line, which is an extension of the leading edge portion S. However, since the extension 223 is not in the plane of the paper, B' is not the sweep angle. In FIG. 6 a line L has been drawn which represents a closest fit straight line to the leading edge portion R. That line is also not in the plane of the paper in FIG. 6. The same line L is shown in FIG. 4, which is a view essentially perpendicular to a radial line. Therefore, FIG. 7, which is a view in the Direction E of FIG. 4 perpendicular to the line L and to a radial line Z, shows a true view of the sweep angle B as herein defined.

As discussed above, in accordance with the present invention, the outer span portion 222 may be anywhere from 5% to 50% of the full vane span, and the sweep angle B may be anywhere from 10° to 60°. Therefore, the inner span portion 224 may be anywhere from 50% to 95% of the full vane span. In any particular engine, the most appropriate sweep angle B and the percentage of the vane span that should have a swept leading edge will necessarily be a compromise between noise reduction, performance, structural, weight, manufacturing and cost issues. It is believed that best noise reduction results, without serious other consequences, will be obtained using sweep angles of between 25° and 50° on only the radially outer 10% to 30% of the vane leading edge.

Examples of other possible configurations for FEGV's configured according to the present invention are shown in FIGS. 8a–8d. Reference numerals in FIGS. 8a–8d that are the same as those used in FIGS. 2–6 represent the same feature or component shown in FIGS. 2–6. For simplicity and ease of explanation, in FIGS. 8a–8d none of the leading edges are curved, and all are within the plane of the paper (i.e. no lean).

Figure 8A:
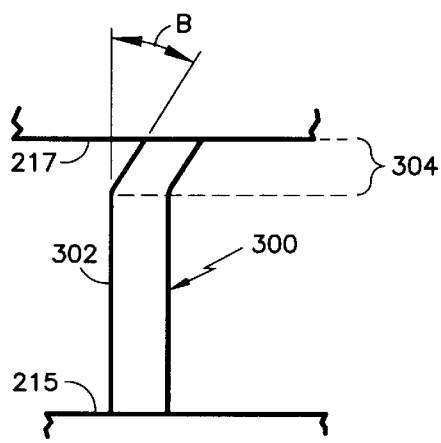
FIGS. 8a through 8d show examples of alternate embodiments of fan exit guides vanes according to the present invention.

In the vane 300 of FIG. 8a, the leading edge 302 of the radially outer portion 304 has a rearward sweep angle B rather than a forward sweep angle like the vane 210. Similar noise reduction benefits should be achieved whether the sweep angle is rearward or forward. The decision for rearward or forward sweep is based upon reducing overall (tone and broadband) noise, as well as structural/ manufacturability considerations. Some assessment of the effect of part-span sweep on the tone noise component should also be done to finalize the design in any particular engine application.

Figure 8B:
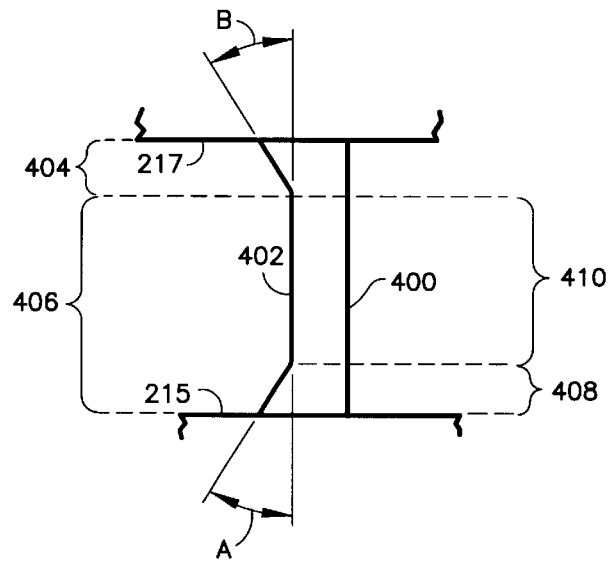

In FIG. 8b, the vane 400 has an outer vane span portion 404 and an inner vane span portion 406. The vane leading edge is designated by the reference numeral 402. The leading edge 402 has a forward sweep angle B over the outer vane span portion 404 adjacent the outer duct wall 217. The inner vane span portion is divided into an inner vane span portion 408 adjacent the inner duct wall 215 and a central vane span portion 410. The inner vane span portion 408 has a swept leading edge with a rearward sweep angle A. The leading edge of the central vane span portion 410 has 0° or no sweep. This configuration might be used if it is determined that significant noise is being generated by the fan flow interacting with the vane adjacent both the inner and outer duct walls.

Figure 8C:
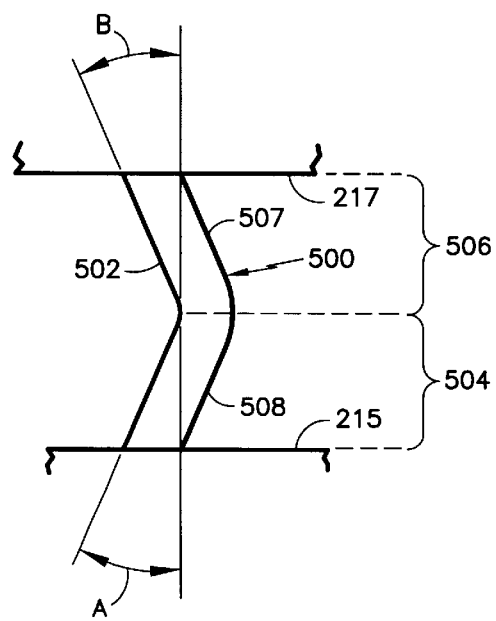

A variation on the configuration of FIG. 8b is the vane 500 of FIG. 8c, wherein the entire length of the leading edge 502 of the vane inner portion 504 has a rearward sweep angle A, while the leading edge of the outer portion 506 has a forward sweep angle B. In this case, the inner and outer trailing edge portions 507, 508 are also swept such that the vane has a chevron shape. Note that the sweeping of the trailing edge is not believed to contribute to any noise reduction. It would be done to save weight.

Figure 8D:
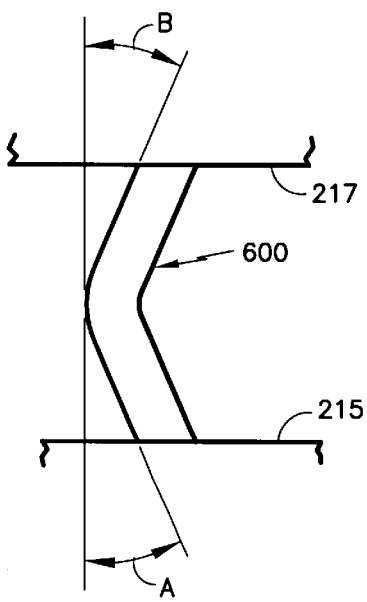

A variation on the configuration of FIG. 8c is the vane 600 shown in FIG. 8d. The vane 600 also has a chevron shape, but the chevron faces in the opposite direction from that of the vane 500. Here the sweep angle A is a forward sweep angle and the sweep angle B is a rearward sweep angle.

One advantage of all the embodiments described above is that, compared to the prior art, the overall axial length of the FEGV's of the present invention, from their upstream most point to their downstream most point, is less than that of prior art vanes with equivalent sweep. This is because the vane leading edge either is not swept over the full radial extent of the bypass duct; or, where it is swept over the full radial extent, it sweeps with a combination of both forward and rearward sweep, thereby reducing the overall axial length.

Figure 9:
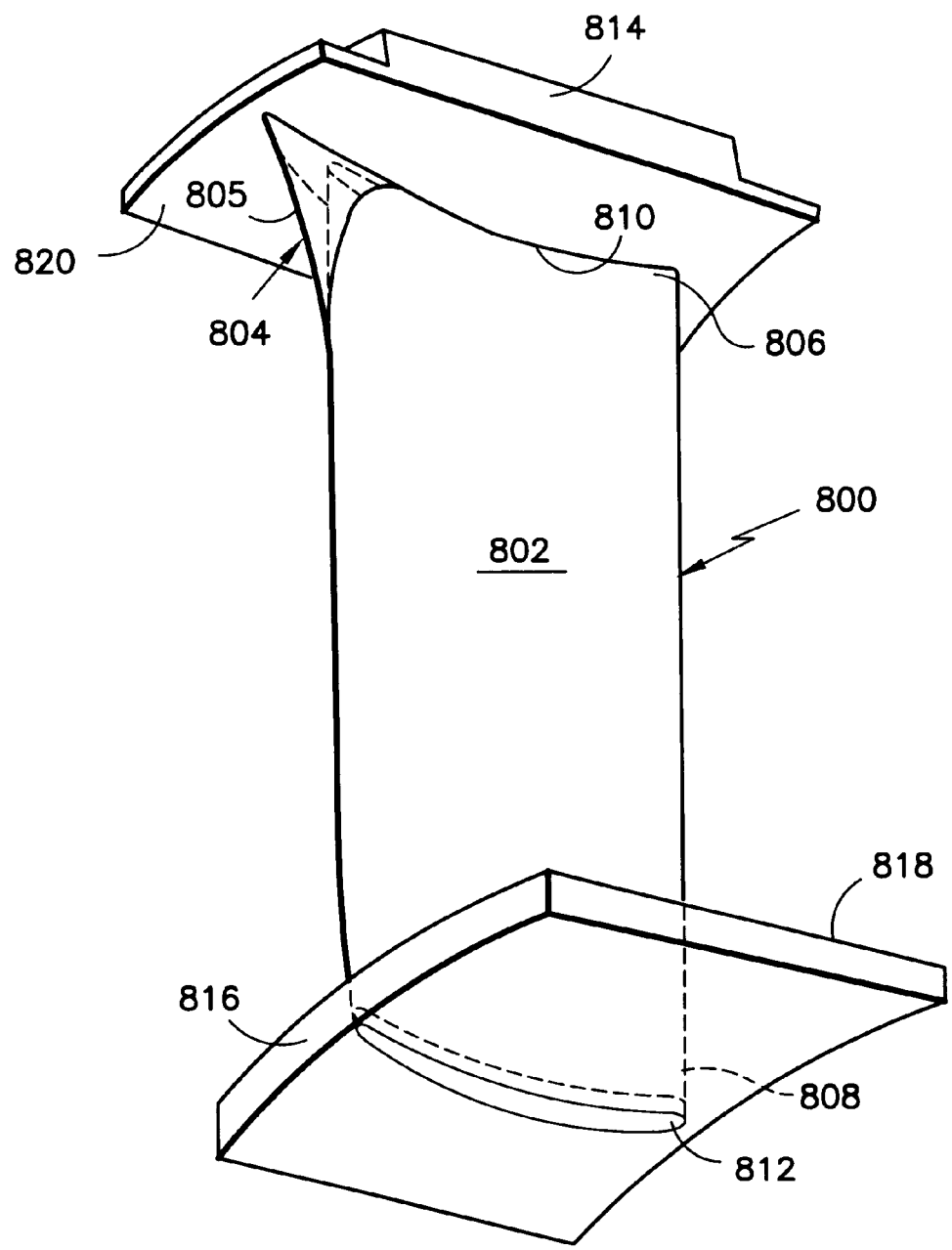
FIG. 9 is an isometric view of a fan exit guide vane according the present invention, showing one means of construction.

FIG. 9 shows one method of constructing an FEGV of the type described in FIGS. 2–6. The vane 800 is formed by combining an airfoil 802 and an edge extender 804. The airfoil 802 has a constant cross section along a radial stacking line and may be economically stamped out of sheet stock. The radially outer end 806 of the airfoil and the radially inner end 808 of the airfoil fit into respective airfoil shaped slots 810, 812 in respective outer and inner vane platforms 814, 816. The vane ends 806, 808 may be secured within the slots with a silicon rubber potting compound (not shown), as is well known in the art. The radially outwardly facing surface 818 of the platform 816, and the radially inwardly facing surface 820 of the platform 814 form portions of the bypass duct annular flow path surfaces when positioned within the engine.

The edge extender 804 abuts the upstream edge of the airfoil 802 and the surface 820 of the platform 814 and is shaped to form a swept leading edge 805 of the outer portion of the vane 800. In this example, the vane extender is secured to the platform, such as by being formed as an integral part of the platform. It may also be formed as a separate piece secured to the platform by any suitable means. It may also be secured directly to the airfoil 802.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A gas turbine engine having a row of fan rotor blades, an annular fan duct immediately downstream of said row of fan blades for receiving a flow of air passing through said row of blades, said fan duct having an inner flow path wall and an outer flow path wall, and a row of fan exit guide vanes disposed within said fan duct downstream of said row of fan blades for turning the air exiting said row of fan blades, said vane row comprising a plurality of circumferentially spaced apart guide vanes, each of said guide vanes having a leading edge extending across said fan duct from said inner wall to said outer wall, said leading edge including a radially inner portion extending over no less than about 50% of the span of said vane, and a radially outer portion that is at least 5% and no more than 50% the full span of said vane, said inner and outer portions meeting to form the full length of said leading edge, said inner portion having a sweep angle A, and said outer portion having either a rearward or forward sweep angle B of between 10° and 60° over the full length of said outer portion, wherein if said sweep angle B is forward, then said sweep angle A is a rearward sweep angle or substantially 0°, and if said sweep angle B is rearward, then said sweep angle A is a forward sweep angle or substantially 0°.

2. The gas turbine engine according to claim 1, wherein sweep angle B is forward, and sweep angle A is substantially 0° over said entire inner portion of said leading edge.

3. The gas turbine engine according to claim 2, wherein said outer portion of each vane is 10% to 30% of said vane span.

4. The gas turbine engine according to claim 3, wherein sweep angle B is between 25° and 50°.

5. The gas turbine engine according to claim 1, wherein said vane is chevron shaped.

6. The gas turbine engine according to claim 2, wherein said row of vanes includes a plurality of circumferentially spaced apart radially outer platforms, said outer platforms having a radially inwardly facing surface forming a portion of said outer flow path wall, wherein each of said guide vanes includes an edge extender and a separate airfoil portion, said airfoil portion having a radially outer end secured to one of said platforms, wherein said edge extender is secured to said one platform and abuts said airfoil to form said outer portion swept leading edge of said guide vane.

* * * * *